US012708889B2

(12) United States Patent
Itoguchi

(10) Patent No.: US 12,708,889 B2
(45) Date of Patent: Aug. 18, 2026

(54) POLYOLEFIN PRODUCTION APPARATUS AND POLYOLEFIN PRODUCTION METHOD

(71) Applicant: Sumitomo Chemical Company, Limited, Tokyo (JP)

(72) Inventor: Satoshi Itoguchi, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 559 days.

(21) Appl. No.: 18/216,643

(22) Filed: Jun. 30, 2023

(65) Prior Publication Data

US 2024/0009646 A1 Jan. 11, 2024

(30) Foreign Application Priority Data

Jul. 5, 2022 (JP) ................................ 2022-108284

(51) Int. Cl.

| | |
|---|---|
| ***C08F 2/01*** | (2006.01) |
| ***B01J 4/00*** | (2006.01) |
| ***B01J 19/06*** | (2006.01) |
| ***B01J 19/24*** | (2006.01) |
| ***C08F 2/34*** | (2006.01) |
| ***C08F 110/00*** | (2006.01) |

(52) U.S. Cl.

CPC ............... *B01J 19/06* (2013.01); *B01J 4/008* (2013.01); *B01J 19/2465* (2013.01); *C08F 2/01* (2013.01); *C08F 2/34* (2013.01); *C08F 110/00* (2013.01); *B01J 2204/005* (2013.01)

(58) Field of Classification Search

CPC ............... C08F 10/00; C08F 2/01; C08F 2/34

See application file for complete search history.

(56) References Cited

U.S. PATENT DOCUMENTS

| | | | |
|---|---|---|---|
| 5,633,333 A | 5/1997 | Chinh | |
| 5,898,053 A | 4/1999 | Leaney et al. | |
| 5,928,612 A | 7/1999 | Chinh | |
| 5,929,180 A * | 7/1999 | Chinh | B01J 8/1809 526/901 |
| 6,407,184 B1 | 6/2002 | Matsuda et al. | |

(Continued)

FOREIGN PATENT DOCUMENTS

| | | |
|---|---|---|
| EP | 2803680 A1 | 11/2014 |
| JP | H08-253517 A | 10/1996 |

(Continued)

*Primary Examiner* — Mark S Kaucher

(74) *Attorney, Agent, or Firm* — Panitch Schwarze Belisario & Nadel LLP

(57) ABSTRACT

Polyolefin powder is transferred from a gas-phase polymerization reactor to a solid-gas separator having a relatively low pressure, while an amount of monomer gas discharged from the gas-phase polymerization reactor is kept low.

A polyolefin production apparatus includes a gas-phase polymerization reactor 10 that polymerizes an olefin monomer to produce polyolefin powder, a solid-gas separator 20, a circulation pipe LC having both ends connected to the solid-gas separator, and provided with a first compressor CP1, a hopper 30, a first powder-conveying pipe L1 connecting the gas-phase polymerization reactor and the hopper, and provided with a first valve V1 halfway, and a second powder-conveying pipe L2 connecting an outlet of the hopper and the circulation pipe, and provided with a second valve V2 halfway.

8 Claims, 1 Drawing Sheet

(56) References Cited

U.S. PATENT DOCUMENTS

| | | | |
|---|---|---|---|
| 2016/0108147 | A1 | 4/2016 | Penzo et al. |
| 2021/0102009 | A1 | 4/2021 | Mei et al. |

FOREIGN PATENT DOCUMENTS

| | | | |
|---|---|---|---|
| JP | 2000-344804 | A | 12/2000 |
| JP | 2007-284548 | A | 11/2007 |
| JP | 2020-528961 | A | 10/2020 |

* cited by examiner

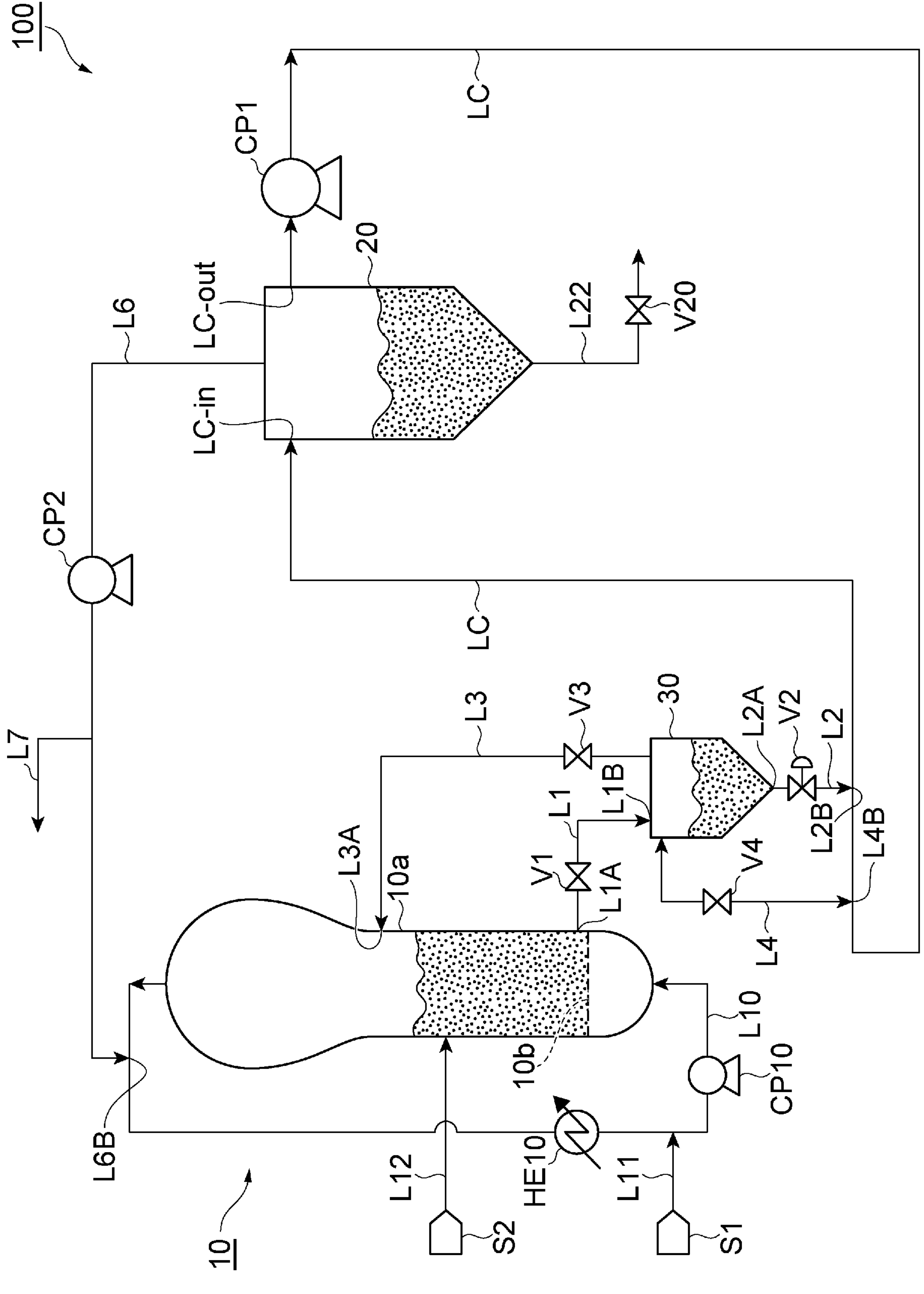
100
LC
CP1
20
L6
LC-out
L22
V20
LC-in
CP2
LC
L7
L3
V3
30
L2A
V2
L2
L3A
10a
L1
L1B
L2B
V1
L1A
V4
L4B
L4
L10
10b
CP10
L6B
L12
HE10
L11
10
S2
S1

POLYOLEFIN PRODUCTION APPARATUS AND POLYOLEFIN PRODUCTION METHOD

CROSS REFERENCE TO RELATED APPLICATIONS

This application claims priority under 35 U.S.C. § 119(b) to Japanese Application No. 2022-108284, filed on Jul. 5, 2022, the disclosures of which is incorporated herein by reference in it entirety.

BACKGROUND OF THE INVENTION

Field of the Invention

The present invention relates to a polyolefin production apparatus.

Description of the Related Art

Conventionally, there is known a polyolefin production apparatus as described in JP-A-2007-284548, for example. In a conventional polyolefin production apparatus, polyolefin powder produced in a gas-phase polymerization reactor is conveyed to a solid-gas separator by being entrained by monomer gas flowing from the gas-phase polymerization reactor to the solid-gas separator according to a pressure difference between a pressure of gas in the gas-phase polymerization reactor and a pressure of gas in the solid-gas separator having a pressure lower than the pressure of the gas in the gas-phase polymerization reactor.

In the conventional apparatus, however, a large amount of olefin monomer is discharged from the gas-phase reactor when the polyolefin powder is conveyed. In this case, in order to reuse the discharged monomer gas, it is necessary to increase pressure of the monomer gas again and return the monomer gas to the gas-phase reactor, or it is necessary to purify monomers, separate the monomers for each monomer species, and then utilize the separated monomers as raw material monomers again, which may not be efficient.

The present invention has been made to solve the above problems, and an object thereof is to provide a polyolefin production apparatus and polyolefin production method capable of transferring polyolefin powder from a gas-phase polymerization reactor to a solid-gas separator having a relatively low pressure, while keeping an amount of monomer gas discharged from the gas-phase polymerization reactor low.

SUMMARY OF THE INVENTION

<Aspect 1>

A polyolefin production apparatus including

- a gas-phase polymerization reactor that polymerizes an olefin monomer to produce polyolefin powder,
- a solid-gas separator,
- a circulation pipe having both ends connected to the solid-gas separator, and provided with a first compressor,
- a hopper,
- a first powder-conveying pipe connecting the gas-phase polymerization reactor and the hopper, and provided with a first valve halfway, and
- a second powder-conveying pipe connecting an outlet of the hopper and the circulation pipe, and provided with a second valve halfway.

<Aspect 2>

The polyolefin production apparatus according to <Aspect 1>, in which the first powder-conveying pipe is disposed such that an opening on a side closer to the hopper is lower in position than an opening on a side closer to the gas-phase polymerization reactor.

<Aspect 3>

The polyolefin production apparatus according to Aspect 1 or 2, the polyolefin production apparatus further including a first gas-return pipe communicating the gas-phase polymerization reactor and the hopper, and provided with a third valve.

<Aspect 4>

The polyolefin production apparatus according to any one of Aspects 1 to 3, the polyolefin production apparatus further including a communication pipe communicating an upper portion of the hopper and the circulation pipe, and provided with a fourth valve.

<Aspect 5>

The polyolefin production apparatus according to any one of Aspects 1 to 4, the polyolefin production apparatus further including a second gas-return pipe connecting the solid-gas separator and the gas-phase polymerization reactor, and a second compressor provided on the second gas-return pipe.

<Aspect 6>

The polyolefin production apparatus according to Aspect 5, in which a gas discharge rate [Nm$^3$/h] of the first compressor is higher than a gas discharge rate of the second compressor.

<Aspect 7>

The polyolefin production apparatus according to any one of Aspects 1 to 6, in which an inner diameter of the circulation pipe is 0.025 m to 0.75 m.

<Aspect 8>

The polyolefin production apparatus according to any one of Aspects 1 to 7, in which the circulation pipe is provided with the first compressor solely.

<Aspect 9>

A method for producing polyolefin by using the polyolefin production apparatus according to any one of <Aspect 1> to <Aspect 8>, the method including

- polymerizing an olefin monomer in the gas-phase polymerization reactor to produce polyolefin powder,
- conveying the polyolefin powder in the gas-phase polymerization reactor to a hopper,
- discharging at least a portion of gas in the solid-gas separator through a circulation pipe, and then returning the portion of the gas into the solid-gas separator again, and
- feeding polyolefin powder discharged from the hopper to the circulation pipe, and conveying the polyolefin powder to the solid-gas separator by causing the polyolefin powder being entrained by gas flowing through the circulation pipe.

According to the present invention, there are provided a polyolefin production apparatus and polyolefin production method capable of transferring polyolefin powder from a gas-phase polymerization reactor to a solid-gas separator having a relatively low pressure, while keeping an amount of monomer gas discharged from the gas-phase polymerization reactor low.

BRIEF DESCRIPTION OF THE DRAWING

FIG. 1 is a process flow diagram of a polyolefin production apparatus according to an embodiment.

DETAILED DESCRIPTION OF THE PREFERRED EMBODIMENT

A polyolefin production apparatus according to an embodiment will be described with reference to the drawing.

FIG. 1 is a process flow diagram of a polyolefin production apparatus 100 according to an embodiment.

The polyolefin production apparatus 100 according to the present embodiment mainly includes a gas-phase polymerization reactor 10, a solid-gas separator 20, a hopper 30, a circulation pipe LC, a first powder-conveying pipe L1, and a second powder-conveying pipe L2.

The gas-phase polymerization reactor 10 is a reactor that polymerizes olefin monomer gas therein to produce polyolefin powder. In the present embodiment, the gas-phase polymerization reactor is a so-called fluidized bed reactor, and includes a cylindrical container 10*a* and a gas dispersion plate 10*b* provided in the cylindrical container 10*a*.

The gas-phase polymerization reactor 10 further includes a gas circulation line L10 connecting a top and bottom of the cylindrical container 10*a*. The gas circulation line L10 is provided with a compressor CP10 and a heat exchanger HE10 for heat removal.

Monomer gas is fed from the monomer gas source S1 to the gas circulation line L10 through a line L11.

A polymerization catalyst feed source S2 is connected to the cylindrical container 10*a* via a line L12. The polymerization catalyst feed source S2 feeds a polyolefin polymerization catalyst, polyolefin powder polymerized in the preceding reactor, or slurry including polyolefin powder.

The monomer gas discharged from a top of the gas-phase polymerization reactor 10 is subjected to heat removal by the heat exchanger HE10, mixed with monomer gas fed from the monomer gas source S1 through the line L11, pressurized by the compressor CP10, and fed into the cylindrical container 10*a*, thereby fluidizing polyolefin particles.

The solid-gas separator 20 is an apparatus that separates particles and gas. In the present embodiment, a solid-gas separation drum is used as the solid-gas separator. When a mixture of particles and gas is fed to the solid-gas separation drum, the particles are separated and stored downward by the action of gravity, while a gas phase remains in an upper portion of the solid-gas separation drum.

The solid-gas separator 20 includes the circulation pipe LC having both ends connected to the solid-gas separator 20.

The circulation pipe LC is provided with a first compressor CP1. When the first compressor CP1 is driven, the gas in the solid-gas separator 20 is discharged from one end LC-out of the circulation pipe LC, passes through the circulation pipe LC, and is returned from another end LC-in of the circulation pipe LC into the solid-gas separator 20, by which a circulation flow of the gas can be formed.

The both ends LC-out and LC-in of the circulation pipe LC are connected to an upper portion of the solid-gas separator 20, so that powder in the solid-gas separator 20 is difficult to be discharged from the solid-gas separator 20 to the circulation pipe LC, and is difficult to be stirred up by the gas flowing in from the circulation pipe LC.

A bottom of the solid-gas separator 20 has a conical shape. A lowermost portion of the solid-gas separator 20 is provided with a powder discharge line L22 having a valve V20. Thus, recovered polyolefin powder can be transferred for a post-process.

The hopper 30 is a container capable of storing powder and sealing gas. When the powder, or a mixture of the powder and the gas is fed to the hopper 30, the powder is separated and stored in a lower portion of the hopper 30 by the action of gravity. A capacity of the hopper 30 is preferably as small as about 0.1% to 20.0% of a capacity of the gas-phase polymerization reactor 10, and more preferably about 0.3% to 5%. A plurality of hoppers 30 may be installed in parallel. In that case, each of the hoppers is preferably provided with the first powder-conveying pipe L1, the second powder-conveying pipe L2, and a first gas-return pipe L3. The circulation pipe LC, in this case, is preferably common to the respective hoppers 30. In addition, in order to reduce monomer gas entrained from the hopper 30 to the solid-gas separator 20, other than monomers, a gas inert to a polymerization reaction, such as alkane or nitrogen, may be fed to a lower portion of the hopper 30.

The solid-gas separator 20 is preferably away in a horizontal direction from the gas-phase polymerization reactor 10 farther than the hopper 30 is, and/or the solid-gas separator 20 is preferably provided at a position higher than a position of the gas dispersion plate 10*b* of the gas-phase polymerization reactor 10. A capacity of the solid-gas separator 20 is larger than the capacity of the hopper 30, and is preferably 110% to 5000% of the capacity of the hopper 30. The capacity of the solid-gas separator is preferably 200% to 3000% of the capacity of the hopper 30.

A lower portion of the gas-phase polymerization reactor 10, specifically, a portion above the gas dispersion plate 10*b* (a portion where there is a fluidized bed of the powder), and an upper portion of the hopper 30 are connected by the first powder-conveying pipe L1 provided with a first valve V1 halfway. Of the first powder-conveying pipe L1, an opening L1B on a side closer to the hopper 30 is preferably lower in position than an opening L1A on a side closer to the gas-phase polymerization reactor 10. It is preferable that the first powder-conveying pipe L1 have a downward-sloping portion and/or a downward vertical portion from the opening L1A toward the opening L1B, because, in this case, the powder can be conveyed from the gas-phase polymerization reactor 10 to the hopper 30 by the action of gravity. An inner diameter of the first powder-conveying pipe L1 may be 25 mm to 1000 mm. Although a type of the first valve V1 is not limited, a ball valve or V-port valve excellent in partitioning powder in pipes is preferable.

Note that, in the present specification, "by the action of gravity" means utilizing at least the action of gravity, and also means utilizing a pressure difference or the like, other than gravity.

The lower portion of the gas-phase polymerization reactor 10 and the upper portion of the hopper 30 are also connected by the first gas-return pipe L3 provided with a third valve V3 halfway. The lower portion of the gas-phase polymerization reactor 10, specifically, is the portion above the gas dispersion plate 10*b* (the portion where there is a fluidized bed of the powder). An opening L3A of the first gas-return pipe L3, the opening L3A being on a side closer to the gas-phase polymerization reactor 10, is higher in position than the opening L1A of the first powder-conveying pipe L1, the opening L1A being on a side closer to the gas-phase polymerization reactor 10. As a result, gas fed to the hopper from the first powder-conveying pipe L1 can be smoothly returned from an inside of the hopper 30 to the gas-phase polymerization reactor 10. The opening L3A is preferably higher in position than a portion where there is a fluidized bed of the powder. The opening L3A may be connected to the gas circulation line L10 instead of to the cylindrical container 10*a* of the gas-phase polymerization reactor 10, and may also be connected to a second gas-return pipe L6 as long as the second gas-return pipe L6 is downstream of a second compressor CP2. Although a type of the third valve V3 is not limited, a ball valve that can open and close quickly and is excellent in partitioning fluid in pipes is preferable.

An opening (powder outlet) L2A on the lower portion of the hopper 30 and the circulation pipe LC are connected by the second powder-conveying pipe L2 provided with a second valve V2 halfway. An inner diameter of the second powder-conveying pipe L2 may be 25 mm to 750 mm. Although a type of the second valve V2 is not limited, a V-port valve capable of adjusting a flow rate is preferable. A rotary valve capable of adjusting a flow rate is also preferable.

On the circulation pipe LC, an opening L2B of the second powder-conveying pipe L2, the opening L2B being on a side closer to the circulation pipe LC, is preferably disposed on a portion on a discharge side of the first compressor CP1. This makes it difficult for the powder to be fed to the first compressor CP1.

In the present embodiment, the opening L2B of the second powder-conveying pipe L2, the opening L2B being on the side closer to the circulation pipe LC, is lower in position than an opening L2A of the second powder-conveying pipe L2, the opening L2A being on a side closer to the hopper 30. The second powder-conveying pipe L2 has a downward-sloping portion and/or a downward vertical portion from the opening L2A toward the opening L2B. With the second powder-conveying pipe L2, the powder can be conveyed from the hopper 30 to the circulation pipe LC by the action of gravity.

The upper portion of the hopper 30 and the circulation pipe LC are connected by a communication pipe L4 provided with a fourth valve V4. On the circulation pipe LC, an opening L4B of the communication pipe L4, the opening L4B being on a side closer to the circulation pipe LC, is preferably being at a portion on the discharge side of the first compressor CP1. Although a type of the fourth valve V4 is not limited, a ball valve that can open and close quickly and is excellent in partitioning fluid in pipes is preferable.

An upper outlet of the solid-gas separator 20 and the gas circulation line L10 of the gas-phase polymerization reactor 10 are connected by the second gas-return pipe L6 including the second compressor CP2. A junction L6B between the second gas-return pipe L6 and the circulation pipe LC is preferably positioned upstream of the heat exchanger HE10. The second gas-return pipe L6 may also be connected to the cylindrical container 10*a* of the gas-phase polymerization reactor 10.

A line L7 for discharging the gas is further provided above the solid-gas separator 20. The line L7 may be directly connected to the solid-gas separator 20. In a case where the gas discharged from the line L7 is subjected to monomer purification by a rectification column or the like in a downstream process so that monomer is reused, on the second gas-return pipe L6, the line L7 is preferably branched from a downstream of the second compressor CP2 having a higher pressure than an upstream of the second compressor CP2 does, as illustrated in FIG. 1. The line L7 may be branched from the upstream of the second compressor CP2 in the second gas-return pipe L6.

A gas discharge rate of the first compressor CP1 of the circulation pipe LC is preferably set to be higher than a gas discharge rate of the second compressor CP2 of the second gas-return pipe L6. Accordingly, a sufficient amount of gas can be circulated through the circulation pipe LC. Comparison of the gas discharge rate is possible by converting an amount of gas fed from a suction side to a discharge side per unit time, one hour for example, into an amount of air [Nm$^3$/h] with a temperature of 0° C. and a humidity of 0% at atmospheric pressure.

An inner diameter of the circulation pipe LC is preferably 0.025 m to 0.75 m. This makes it easy to reduce, for example, clogging when the gas is transferred through the circulation pipe LC while entraining the polyolefin powder.

(Method for Producing Polyolefin)

Next, a method for producing polyolefin according to the present embodiment will be described.

First, a polyolefin polymerization catalyst is supplied from the polymerization catalyst feed source S2 to the gas-phase polymerization reactor 10. The polyolefin polymerization catalyst is preferably polyolefin powder including a polyolefin polymerization catalyst, and more preferably slurry containing polyolefin powder and monomer liquid, the polyolefin powder containing a polyolefin polymerization catalyst.

For example, polyolefin particles containing a catalyst may be fed to the gas-phase polymerization reactor 10. The polyolefin particles containing the catalyst is previously produced by a pre-polymerization reactor (not illustrated) that polymerizes the polyolefin particles in presence of the catalyst. A method for the pre-polymerization is, but not particularly limited to, a method referred to as bulk polymerization in which olefin is polymerized in liquefied olefin. In this case, slurry containing the liquefied olefin and polyolefin particles is fed from the line L12 to the gas-phase polymerization reactor 10. Alternatively, the pre-polymerization method may be gas-phase polymerization. In this case, gas containing polyolefin particles and monomers is fed from the line L12 to the gas-phase polymerization reactor 10. Alternatively, a pre-polymerization catalyst or a solid catalyst may be directly fed as a polymerization catalyst to the gas-phase polymerization reactor 10.

Next, the gas containing the olefin monomer and fed from the monomer gas source S1 is compressed by the compressor CP10 and fed to the gas-phase polymerization reactor 10 through the gas circulation line L10. The gas containing the olefin monomer may be fed to the gas circulation line L10 downstream of the compressor CP10, or may be directly fed to the cylindrical container 10*a* of the gas-phase polymerization reactor 10.

As a result, the olefin monomer is polymerized in the gas-phase polymerization reactor 10 to produce polyolefin in the gas-phase polymerization reactor 10, by which mass of the polyolefin powder increases. In addition, a fluidized bed is formed in the gas-phase polymerization reactor 10. A polymerization reaction of a monomer is an exothermic reaction. Therefore, the gas, which is discharged from the gas-phase polymerization reactor 10 and contains unreacted olefin, is circulated through the gas circulation line L10 while being cooled by the heat exchanger HE10, and is fed again to the gas-phase polymerization reactor 10 to control temperature of the fluidized bed.

Pressure in the gas-phase polymerization reactor 10 is only required to be within a range in which the olefin can exist in the gas phase in the gas-phase polymerization reactor 10, and is usually 0.3 MPaG or more, preferably 0.5 MPaG or more, more preferably 0.8 MPaG or more, and particularly preferably 1.0 MPaG or more. An upper limit of the pressure is not particularly limited, and may be, for example, 10 MPaG, 8 MPaG, or 5 MPaG. Usually, the pressure is preferably 4 MPaG or less. The pressure is more preferably 3 MPaG or less.

Temperature in the gas-phase polymerization reactor 10 may be usually 0° C. to 120° C., preferably 20° C. to 100° C., and more preferably 40° C. to 100° C.

Next, operation of extracting the polyolefin powder in the gas-phase polymerization reactor 10 to the solid-gas separator 20 is performed. Pressure in the solid-gas separator 20 is lower than the pressure in the gas-phase polymerization reactor 10. The pressure in the solid-gas separator 20 may be between the atmospheric pressure and MPaG. In order to reduce an amount of monomers entrained into the solid-gas separator 20, the pressure in the solid-gas separator 20 is preferably between the atmospheric pressure and 0.05 MPaG. Pressure in the hopper between the gas-phase polymerization reactor 10 and the solid-gas separator 20 varies between the pressure in the gas-phase polymerization reactor 10 and the pressure in the solid-gas separator 20, depending on a process of the operation. Usually, the pressure in the hopper 30 is about the same as the pressure in the solid-gas separator at completion of the powder extraction. At a time of starting this operation, the first valve V1 to the fourth valve V4 are closed.

First, the first compressor CP1 is driven. This allows the gas to be extracted from the solid-gas separator and returned into the solid-gas separator 20 through the circulation pipe LC. That is, a circulation flow passing through the circulation pipe LC and the solid-gas separator is formed. The gas in the circulation flow may be composed mainly of a monomer gas. A flow rate of the gas may be appropriately set within a range in which the polyolefin can be conveyed by airflow in the circulation pipe LC.

Next, the first valve V1 and the third valve V3 are opened. This allows the polyolefin powder in the gas-phase polymerization reactor 10 to be transferred to the hopper through the first powder-conveying pipe L1. In the first powder-conveying pipe L1, along with the transfer of the powder, the gas is also transferred into the gas-phase polymerization reactor 10 by being entrained by the powder. In addition, it is necessary to return the gas from the hopper 30 to the gas-phase polymerization reactor 10 by a volume corresponding to the feed of the powder from the gas-phase polymerization reactor 10. Because the gas in the hopper 30 can return to the gas-phase polymerization reactor 10 through the first gas-return pipe L3, the powder can be smoothly and quantitatively conveyed through the first powder-conveying pipe L1.

After the transfer of a predetermined amount of the polyolefin powder to the hopper 30 is completed, the first valve V1 and the third valve V3 are closed. A timing of the closing may be controlled on the basis of a time of opening the first valve V1, or may be managed on the basis of monitoring of an amount of the powder stored in the hopper 30.

In order to reduce an amount of the monomer gas entrained from the gas-phase polymerization reactor 10 to the solid-gas separator 20, a volume of the powder stored in the hopper 30 is preferably 50% or more, more preferably 70% or more, and still more preferably 80% or more, with respect to the capacity of the hopper 30. A volume of the powder stored in the hopper 30 for stably transferring the polyolefin particles from the cylindrical container 10*a* of the gas-phase polymerization reactor 10 to the hopper 30 is preferably 95% or less, and more preferably 90% or less with respect to the capacity of the hopper 30.

It is preferable that an amount of the powder in the hopper 30 at a completion of the transfer be such that a powdery surface of the powder is lower in position than a junction of the communication pipe L4.

Next, the fourth valve V4 of the communication pipe L4 is opened to release the gas in the hopper 30 to the circulation pipe LC, in order to balance the pressure between the circulation pipe LC and solid-gas separator 20, and the hopper 30.

Next, the second valve V2 of the second powder-conveying pipe L2 is opened, and the powder in the hopper 30 is fed to the circulation pipe LC through the second powder-conveying pipe L2 by the action of gravity. An amount of the feed can be adjusted by a rate of opening of the second valve V2.

The powder fed from the hopper 30 to the circulation pipe LC is transferred to the solid-gas separator 20 by being entrained by the circulation gas flowing in the circulation pipe LC. In addition, because gas for offsetting a volume of void generated by the feed of the powder from inside of the hopper 30 is fed from the circulation pipe LC to the hopper 30 through the communication pipe L4, a smooth discharge through the second powder-conveying pipe L2 is possible.

After a predetermined amount of, all of for example, the powder in the hopper 30 is transferred to the solid-gas separator 20 through the second powder-conveying pipe L2 and the circulation pipe LC, the second valve V2 of the second powder-conveying pipe L2 and the fourth valve V4 of the communication pipe L4 are closed, and the transfer operation is completed.

While the polyolefin powder is transferred from the hopper 30 to the solid-gas separator 20, as necessary, a portion of the monomer gas in the solid-gas separator 20 may be returned to the gas-phase polymerization reactor 10 by the second gas-return pipe L6 and the second compressor CP2 to adjust the pressure in the solid-gas separator 20. In addition, the gas in the solid-gas separator 20 may be appropriately discharged to the outside through the line L7.

After being transferred to the solid-gas separator 20, the polyolefin powder may be subjected to drying, a catalyst deactivation, pelletization, pellet drying, packaging, and the like as necessary.

(Effects)

According to the present embodiment, it is possible to convey the polyolefin powder in the gas-phase polymerization reactor 10 to the hopper 30 through the first powder-conveying pipe L1 while the second valve V2 of the second powder-conveying pipe L2 and the fourth valve V4 of the communication pipe L4 are closed, close the first valve V1 and the third valve V3, open the second valve V2 and the fourth valve V4 to transfer the polyolefin powder in the hopper 30 into the circulation pipe LC through the second powder-conveying pipe L2, and then feed the powder transferred to the circulation pipe LC to the solid-gas separator 20 by causing the powder to be entrained by gas circulating in the circulation pipe LC.

Because a part between the hopper 30 and the circulation pipe LC is closed when the polyolefin powder is transferred from the gas-phase polymerization reactor 10 to the hopper 30, high-pressure gas in the gas-phase polymerization reactor 10 is not released to the solid-gas separator 20. Further, because a part between the gas-phase polymerization reactor 10 and the hopper 30 is closed when the polyolefin powder is transferred from the hopper 30 to the solid-gas separator, the gas in the gas-phase polymerization reactor 10 does not flow into the solid-gas separator 20 through the hopper 30.

When the polyolefin powder is transferred from the gas-phase polymerization reactor 10 to the solid-gas separator 20, first, the polyolefin powder is transferred from the gas-phase polymerization reactor 10 to the hopper 30. The hopper 30 can be filled with the polyolefin powder thickly.

In other words, a volume fraction of the gas in the hopper 30 can be sufficiently lower than a volume fraction of when air flows in a normal state. Therefore, even if the polyolefin powder is then transferred by airflow from the hopper 30 to the solid-gas separator 20, an amount of the entrained monomer gas can be reduced as compared with a case where the polyolefin powder is directly conveyed by airflow from the gas-phase polymerization reactor 10 to the solid-gas separator 20.

Therefore, it is possible to convey the polyolefin powder from the gas-phase polymerization reactor 10 to the solid-gas separator 20 at a position horizontal to and away from the gas-phase polymerization reactor 10 and/or at a position higher than a position of the gas-phase polymerization reactor 10, by utilizing the gas circulating in the circulation pipe LC without releasing a large amount of high-pressure gas from the gas-phase polymerization reactor 10 to the solid-gas separator 20. As a result, it is possible to reduce a large amount of low-pressure olefin monomer gas produced along with transfer of the powder, by which energy loss due to, for example, repressurization of the monomer gas can be reduced.

In the present embodiment, the first gas-return pipe L3 having the third valve V3 is provided. Therefore, when the first valve V1 is opened and the polyolefin powder is transferred from the gas-phase polymerization reactor 10 to the hopper 30, the gas in the hopper 30 can be returned from another line to the gas-phase polymerization reactor. Thus, the polyolefin powder can be smoothly transferred by the first powder-conveying pipe L1.

In the present embodiment, the communication pipe L4 having the fourth valve V4 is provided. Therefore, the pressure in the hopper 30 and the pressure in the circulation pipe LC can be balanced before the second valve V2 of the second powder-conveying pipe L2 is opened. Thus, quantitative supply performance when the second valve V2 is opened is improved. In addition, gas of an amount corresponding to a decrease in a particle volume is fed to the hopper 30 through the communication pipe L4 when the powder is discharged from the hopper 30. Thus, the polyolefin powder can be smoothly transferred by the second powder-conveying pipe L2.

The fourth valve V4 does not necessarily need to be opened before the second valve V2 is opened. The fourth valve V4 may be opened after the pressure in the hopper 30 decreases by opening the second valve V2.

In the present embodiment, the second gas-return pipe L6 including the second compressor CP2 is provided. Therefore, there is an effect that the monomer gas discharged from the gas-phase polymerization reactor 10 can be more effectively utilized.

In the present embodiment, in a case where the gas discharge rate of the first compressor CP1 is larger than the gas discharge rate of the second compressor CP2, there is an effect that particles can be stably transferred from the hopper 30 to the solid-gas separator 20 utilizing a large amount of gas.

In the present embodiment, in a case where the inner diameter of the circulation pipe LC is 0.025 m to 0.75 m, there are effects that clogging or the like is difficult to occur in powder conveyance using a circulation flow of monomer gas, and that a gas linear velocity necessary for pneumatic conveying can be maintained.

Further, in a case where one first compressor CP1 is provided solely in the circulation pipe LC, there is an effect that interference between the compressors does not occur, and smooth transfer is achieved.

(Catalyst Used for Producing Polyolefin)

Examples of the catalyst used for producing the polyolefin in the present invention include a Ziegler-Natta catalyst and a metallocene catalyst, and the Ziegler-Natta catalyst is preferable. Examples of the Ziegler-Natta catalyst contain a Ti—Mg-based catalyst such as a solid catalyst component obtained by bringing a titanium compound into contact with a magnesium compound, a catalyst containing a solid catalyst component obtained by bringing a titanium compound into contact with a magnesium compound, an organoaluminum compound, and, as necessary, a third component such as an electron-donating compound, and the like. The Ziegler-Natta catalyst is preferably a catalyst containing a solid catalyst component obtained by bringing a titanium compound into contact with a magnesium compound, an organoaluminum compound, and, as necessary, a third component such as an electron-donating compound. The Ziegler-Natta catalyst is more preferably a catalyst including a solid catalyst component obtained by bringing a halogenated titanium compound into contact with a magnesium compound, an organoaluminum compound, and an electron-donating compound. As the catalyst, a catalyst brought into contact with a small amount of olefin and pre-activated may be used.

Examples of details of such a catalyst and a method for producing the catalyst are disclosed in, for example, JP-A-7-216017 and JP-A-2004-67850.

(Olefin and Polyolefin)

Examples of olefin to be fed to each gas-phase polymerization reactor include one or more types of olefins selected from a group including α-olefin having 1 to 12 carbon atoms. For example, if ethylene is fed to the gas-phase polymerization reactor, particles containing polyethylene are obtained, and if propylene is fed, particles containing polypropylene are obtained.

The olefin fed to each gas-phase polymerization reactor may contain two or more types of olefins. For example, if ethylene and one or more types of olefins selected from a group including α-olefin having 3 to 12 carbon atoms are fed, particles containing an ethylene-α-olefin copolymer are obtained. Specifically, if the α-olefin is propylene, 1-butene, 1-hexene, or 4-methyl-1 pentene, particles containing an ethylene-propylene copolymer, particles containing an ethylene-1-butene copolymer, particles containing an ethylene-1-hexene copolymer, or particles containing an ethylene-4-methyl-1-pentene copolymer are obtained, respectively. If propylene and one or more types of olefins selected from a group including α-olefin having 4 to 12 carbon atoms are fed into the gas-phase polymerization reactor, particles containing a propylene-α-olefin copolymer are obtained. Specifically, if the α-olefin is 1-butene, particles containing a propylene-1-butene copolymer are obtained.

The olefin preferably contains propylene. Thus, particles containing a polymer or copolymer having propylene as a monomer unit are obtained.

To each gas-phase polymerization reactor, an olefin monomer having a composition that provides a polymer or copolymer the same as a polymer or copolymer that constitutes the polyolefin particles fed from the pre-polymerization reactor may be fed. Alternatively, to each gas-phase polymerization reactor, an olefin monomer having a composition that provides a polymer or copolymer different from a polymer or copolymer that constitutes the polyolefin particles fed from the pre-polymerization reactor may be fed. As a result, it is possible to obtain particles including a so-called heterophasic polyolefin material. The particles contain a plurality of polyolefins having different types and ratios of monomer units.

In this case, it is preferable that the olefin monomer in each process necessarily contain propylene. As a result, it is possible to obtain particles including a heterophasic propylene polymer material, which is a mixture of propylene (co)polymers necessarily containing propylene as a monomer unit and having different types and ratios of monomers.

Examples of the heterophasic propylene polymer material according to the present embodiment include:

(i) a propylene polymer material containing a propylene homopolymer component (I-1) and a propylene copolymer component (II), (ii) a propylene polymer material containing a propylene copolymer component (I-2) and a propylene copolymer component (II), and (iii) a propylene polymer material containing a propylene homopolymer component (I-1), propylene copolymer component (I-2), or a propylene copolymer component (II).

The propylene homopolymer component (I-1) is a propylene homopolymer component consisting of a monomer unit derived from propylene. The propylene copolymer component (I-2) and the propylene copolymer component (II) are more specifically as follows.

Propylene Copolymer Component (I-2):

A monomer unit derived from propylene and a copolymer component containing a monomer unit derived from at least one type of olefin selected from a group including ethylene and α-olefin having 4 to 12 carbon atoms. Content of the copolymer component containing a monomer unit derived from at least one type of olefin selected from a group including ethylene and α-olefin having 4 to 12 carbon atoms is 0.01 wt % or more and less than 15 wt %, preferably 0.01 wt % or more and less than 12 wt %, and more preferably 3 wt % or more and less than 10 wt % (a total weight of propylene copolymer component (I-2) is 100 wt %.). Content of the monomer unit derived from propylene may be 85 wt % or more or 90 wt % or more.

Propylene Copolymer Component (II):

A copolymer component containing a monomer unit derived from at least one type of olefin selected from a group including ethylene and α-olefin having 4 to 12 carbon atoms, and a monomer unit derived from propylene. Content of the copolymer component containing a monomer unit derived from at least one type of olefin selected from a group including ethylene and α-olefin having 4 to 12 carbon atoms is 10 wt % or more and 80 wt % or less, preferably 20 wt % or more and 70 wt % or less, and more preferably 25 wt % or more and 60 wt % or less (a total weight of propylene copolymer component (II) is 100 wt %.). Content of the monomer unit derived from propylene may be 20 wt % or more or 90 wt % or less.

Examples of the propylene copolymer component (I-2) include a propylene-ethylene copolymer component, a propylene-1-butene copolymer component, a propylene-1-hexene copolymer component, a propylene-1-octene copolymer component, a propylene-1-decene copolymer component, a propylene-ethylene-1-butene copolymer component, a propylene-ethylene-1-hexene copolymer component, a propylene-ethylene-1-octene copolymer component, and a propylene-ethylene-1-decene copolymer component. The propylene copolymer component (I-2) is preferably a propylene-ethylene copolymer component, a propylene-1-butene copolymer component, or a propylene-ethylene-1-butene copolymer component.

Examples of the propylene copolymer component (II) are similar to the examples described above.

Examples of the heterophasic propylene polymer material according to the present embodiment include a (polypropylene)-(ethylene-propylene copolymer) heterophasic polymerization material, a (propylene-ethylene copolymer)-(ethylene-propylene copolymer) heterophasic polymerization material, and a (polypropylene)-(ethylene-propylene copolymer)-(ethylene-propylene propylene copolymer) heterophasic polymerization material.

In the heterophasic propylene polymer material according to the present embodiment, the propylene copolymer component (II) contained in the heterophasic propylene polymer material is preferably 32 wt % or more, more preferably 35 wt % or more, still more preferably 40 wt % or more (a total weight of the heterophasic propylene polymer material is 100 wt %.).

In the present embodiment, examples of the α-olefin having 4 to 12 carbon atoms, which is used for the propylene copolymer component (I-2) or the propylene copolymer component (II), include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, and 2,2,4-trimethyl-1-pentene. The α-olefin having 4 to 12 carbon atoms is preferably 1-butene, 1-hexene, or 1-octene, and more preferably 1-butene.

The present invention is not limited to the above embodiment, and various modifications are possible.

For example, although the first gas-return pipe L3 is provided in the above embodiment, an aspect in which the first gas-return pipe L3 is not provided is also possible. In this case, for example, by sufficiently increasing a diameter of the first powder-conveying pipe L1, the gas in the hopper 30 can be released to the gas-phase polymerization reactor 10 through the first powder-conveying pipe L1 during the transfer of the powder. In this case, it is preferable to dispose the first powder-conveying pipe L1 such that the opening LIB on a side closer to the hopper 30 is lower than the opening L1A on a side closer to the gas-phase polymerization reactor. Thus, even if the first gas-return pipe L3 is not provided, the powder is easily transferred from the cylindrical container of the gas-phase polymerization reactor 10 to the hopper 30 by the action of gravity.

The opening L1A and opening LIB of the first powder-conveying pipe L1 may have the same height, or the opening LIB may be higher than the opening L1A. In these cases, it is difficult to convey the powder from the gas-phase polymerization reactor to the hopper 30 by the action of gravity. However, the powder can be transferred from the gas-phase polymerization reactor 10 to the hopper 30 by using a pressure difference between the gas-phase polymerization reactor 10 and the hopper 30. In these cases, the apparatus preferably includes the first gas-return pipe L3.

In the present embodiment described above, the opening L2B of the second powder-conveying pipe L2, the opening L2B being on the side closer to the circulation pipe LC, is lower in position than the opening L2A of the second powder-conveying pipe L2, the opening L2A being on a side closer to the hopper 30. However, an aspect that does not satisfy the condition is also possible.

For example, in a case where the fourth valve V4 is not opened, the pressure in the hopper 30 is kept higher than the pressure in the solid-gas separator 20 for a long time. Therefore, even if the opening L2A is lower in position than the opening L2B, at least a portion of the particles in the hopper 30 can be transferred from the hopper 30 to the solid-gas separator 20.

Although the communication pipe L4 is provided in the above embodiment, an aspect in which the communication pipe L4 is not provided is also possible. For example, by sufficiently increasing an inner diameter of the second powder-conveying pipe L2, the hopper 30 can be refilled with gas of an amount corresponding to a volume of the powder discharged from the hopper 30, the gas being transferred from the circulation pipe LC through the second powder-conveying pipe L2, and transfer of powder is possible.

A form of the gas-phase polymerization reactor is not limited, and the gas-phase polymerization reactor may have an entrained bed instead of a fluidized bed. The gas-phase polymerization reactor may have multiple stages.

A form of the solid-gas separator 20 is also not particularly limited, and, other than a drum, a hopper, a cyclone, or the like may be utilized. The solid-gas separator 20 separates a fed mixture (multiphase flow) of gas and solid particles into dense phases (a static bed, a moving bed, and the like) of gas and solid particles. The solid-gas separator 20 does not fluidize or jet powder with gas fed from another line. A bag filter is preferably installed in the solid-gas separator 20 so that particles do not scatter from the solid-gas separator 20 into the circulation pipe LC and the second gas-return pipe L6.

In the present embodiment, the circulation pipe LC and the second gas-return pipe L6 are independently connected to the solid-gas separator 20. However, for example, the one end LC-out of the circulation pipe LC may be branched from a portion of the second gas-return pipe L6, the portion being upstream of the second compressor CP2. The second gas-return pipe L6 may be branched from a portion of the circulation pipe LC, the portion being upstream of the first compressor CP1.

What is claimed is:

1. A polyolefin production apparatus comprising:

a gas-phase polymerization reactor that polymerizes an olefin monomer to produce polyolefin powder;

a solid-gas separator;

a circulation pipe having both ends connected to the solid-gas separator, and provided with only a first compressor;

a hopper;

a first powder-conveying pipe connecting the gas-phase polymerization reactor and the hopper, and provided with a first valve halfway; and a second powder-conveying pipe connecting an outlet of the hopper and the circulation pipe, and provided with a second valve halfway.

2. The polyolefin production apparatus according to claim 1, wherein the first powder-conveying pipe is disposed such that an opening on a side closer to the hopper is lower in position than an opening on a side closer to the gas-phase polymerization reactor.

3. The polyolefin production apparatus according to claim 1, the polyolefin production apparatus further comprising a first gas-return pipe communicating the gas-phase polymerization reactor and the hopper, and provided with a third valve.

4. The polyolefin production apparatus according to claim 1, the polyolefin production apparatus further comprising a communication pipe communicating an upper portion of the hopper and the circulation pipe, and provided with a fourth valve.

5. The polyolefin production apparatus according to claim 1, the polyolefin production apparatus further comprising:

a second gas-return pipe connecting the solid-gas separator and the gas-phase polymerization reactor; and a second compressor provided on the second gas-return pipe.

6. The polyolefin production apparatus according to claim 5, wherein a gas discharge rate of the first compressor is higher than a gas discharge rate of the second compressor.

7. The polyolefin production apparatus according to claim 1, wherein an inner diameter of the circulation pipe is 0.025 m to 0.75 m.

8. A method for producing polyolefin by using the polyolefin production apparatus according to claim 1, the method comprising:

polymerizing an olefin monomer in the gas-phase polymerization reactor to produce polyolefin powder;

conveying the polyolefin powder in the gas-phase polymerization reactor to a hopper;

discharging at least a portion of gas in the solid-gas separator through a circulation pipe, and then returning the portion of the gas into the solid-gas separator again; and feeding polyolefin powder discharged from the hopper to the circulation pipe, and conveying the polyolefin powder to the solid-gas separator by causing the polyolefin powder being entrained by gas flowing through the circulation pipe.

* * * * *